United States Patent [19]

Suzuki

[11] Patent Number: 5,550,687
[45] Date of Patent: Aug. 27, 1996

[54] MAGNETIC DISK DRIVE CAPABLE OF REDUCING DISTORTIONS OF DISKS

[75] Inventor: Takahiro Suzuki, Tokyo, Japan

[73] Assignee: NEC Corporation, Tokyo, Japan

[21] Appl. No.: 330,080

[22] Filed: Oct. 26, 1994

[30] Foreign Application Priority Data

Oct. 26, 1993 [JP] Japan .................................. 5-266818

[51] Int. Cl.⁶ .............................. G11B 17/02; G11B 23/03
[52] U.S. Cl. ..................... 360/98.08; 360/98.02; 360/99.12; 360/133
[58] Field of Search ................ 360/98.08, 99.05, 360/99.12, 133, 98.02

[56] References Cited

U.S. PATENT DOCUMENTS 4,819,105  4/1989  Edwards ............................ 360/98.08
4,945,432  7/1990  Matsudairo et al. ................ 360/98.02
5,243,481  9/1993  Dunckley et al. ............... 360/98.08 X

FOREIGN PATENT DOCUMENTS 2-166683   6/1990  Japan .................................. 360/98.08
4-102282   4/1992  Japan .................................. 360/98.08
4-337558  11/1992  Japan .

*Primary Examiner*—John H. Wolff
*Attorney, Agent, or Firm*—Sughrue, Mion, Zinn, Macpeak & Seas

[57] ABSTRACT

A magnetic disk drive has a top spacer made of ceramic having a high Young's modulus, and a cylindrical clamp ring having a substantial thickness. The top spacer presses a stack of magnetic disks and spacers, which alternate with each other, over the same pressing diameter as a spindle motor. When the top spacer and clamp ring are fastened to the spindle motor by screws, they reduce the deformation of the disks.

2 Claims, 4 Drawing Sheets

Fig. 4

| COEFFICIENT<br>MATERIAL | YOUNG'S MODULUS<br>[GPa] | COEFFICIENT OF<br>LINEAR EXPANSION<br>[1/K] |
|---|---|---|
| ALUMINUM<br>(A7075-T6) | 72 | $23.6 \times 10^{-6}$ |
| STAINLESS STEEL<br>(SUS304) | 197 | $17.3 \times 10^{-6}$ |
| CERAMIC | 260~400 | $10.0 \times 10^{-6}$ |

Fig. 5

WAVING OF TOP DISK 14a (UNIT : μm)

| FASTENING<br>SPACER | 1ST | 2ND | 3RD | AVE |
|---|---|---|---|---|
| ALUMINUM<br>SPACER 18 | 4.4 | 17.5 | 21.7 | 14.4 |
| CERAMIC<br>SPACER 32 | 4.1 | 5.3 | 5.0 | 4.8 |
| CERAMIC<br>SPACER 18A | 5.7 | 6.6 | 4.4 | 5.6 |

5,550,687

MAGNETIC DISK DRIVE CAPABLE OF REDUCING DISTORTIONS OF DISKS

BACKGROUND OF THE INVENTION

The present invention relates to a magnetic disk drive for use in a data processing apparatus or similar apparatus and, more particularly, to a magnetic disk drive capable of reducing the distortions of magnetic disks, i.e., warping in the radial direction and waving in the circumferential direction occurring when the disks are stacked and clamped.

A conventional magnetic disk drive has a spindle motor rotatable at high speed. A plurality of magnetic media in the form of disks are stacked on the spindle motor. The adjoining disks are spaced a predetermined distance from each other by a spacer ring on the spindle motor. A top spacer is mounted on the top of the stack of alternating disks and spacer rings in order to reduce: the deformation of the disks in the circumferential direction. A clamp ring is made of an elastic material and fastened to the upper end of the spindle motor via the top spacer by screws. When the clamp ring is fastened to the spindle motor, it clamps the disks, spacer rings and top spacer to the spindle motor due to the elastic deformation thereof. The spindle motor and clamp ring press the disks and spacer rings over the same diameter as each other. If the spindle motor and clamp ring press the disks and spacer rings at different positions from each other, the disks and spacer rings will deform, or warp, in the radial direction of the disks.

The top spacer and clamp ring of the conventional disk drive suffer from a lack of rigidity since they are made of aluminum and since the thickness thereof is limited in order to reduce the overall thickness of the disk drive. Specifically, when the clamp ring is fastened to the spindle motor, the clamp ring itself deforms to, in turn, cause the top spacer to deform. As a result, the disks themselves deform, following the deformation of the top spacer. Then, magnetic heads included in the disk drive cannot follow such deformation of the disks and, therefore, fail to write or read data in or out of the disks accurately. Moreover, the heads are apt to crash against the deformed disks.

Japanese Patent Laid-Open Publication No. 4-337558, for example, discloses a magnetic disk drive of the type described.

SUMMARY OF THE INVENTION

It is an object of the present invention to provide a magnetic disk drive capable of reducing the distortions of magnetic disks of the kind described.

A magnetic disk drive capable of reducing the distortions of magnetic disks of the present invention has a spindle motor rotatable at high speed while supporting a stack of magnetic disks and spacer rings alternating with each other, a top spacer mounted on the top of the stack for pressing the stack over the same pressing diameter as the spindle motor, and a cylindrical clamp ring affixed to the top of the spindle moor via the top spacer and having a predetermined thickness.

BRIEF DESCRIPTION OF THE DRAWINGS

The above and other objects, features and advantages of the present invention will become more apparent from the following detailed description taken with the accompanying drawings in which:

FIG. 4 is a table listing the characteristics of materials applicable to a top spacer;

FIG. 5 is a table showing values representative of the waving of disks and determined by experiments.

DESCRIPTION OF THE PREFERRED EMBODIMENT

Figure 1:
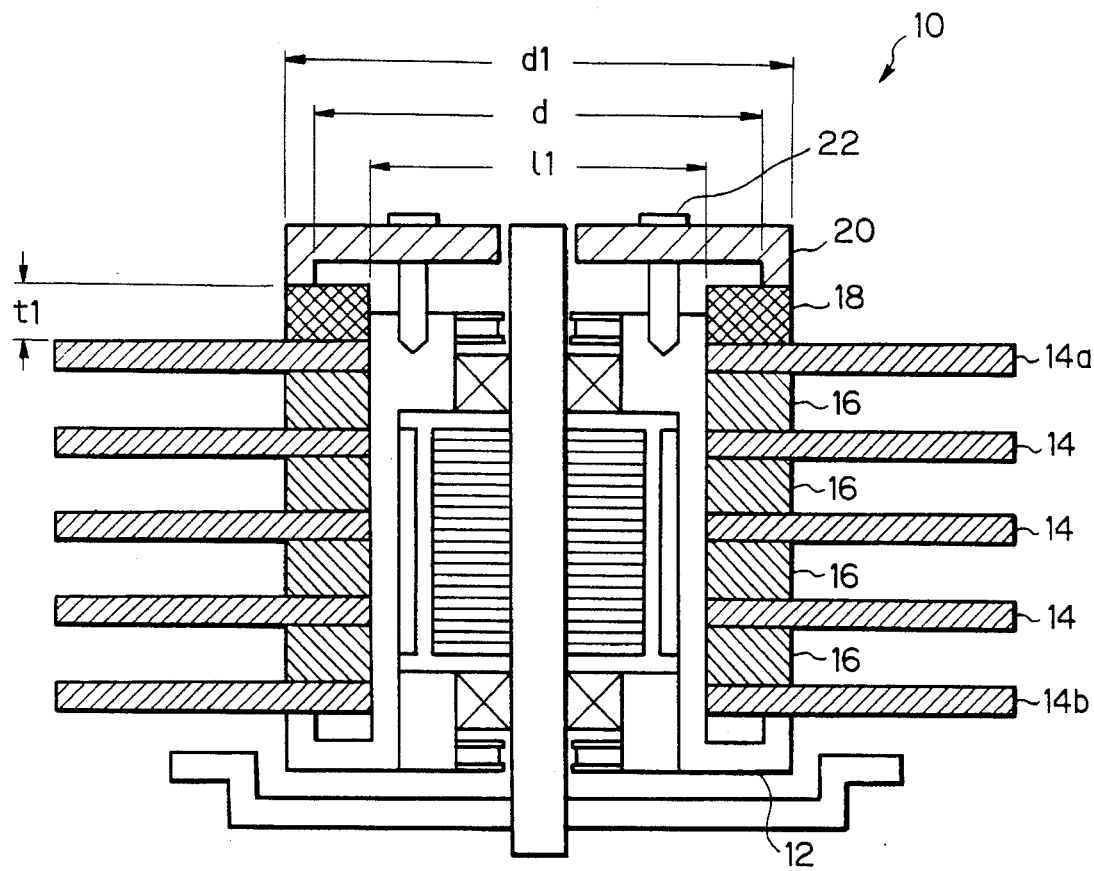
FIG. 1 is a section showing a conventional magnetic disk drive.
Figure 2:
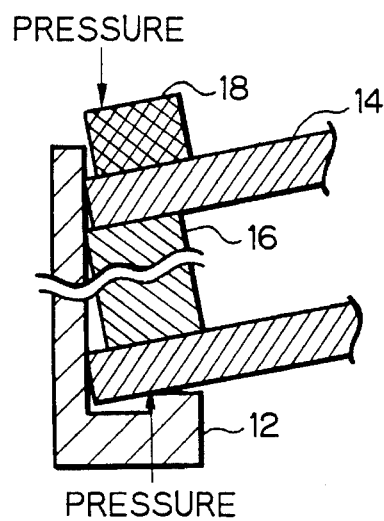
FIG. 2 is a section showing how disks included in the conventional disk drive deform.

To better understand the present invention, a brief reference will be made to a conventional magnetic disk drive, shown in FIG. 1. As shown, the disk drive, generally 10, has a spindle motor 12 rotatable at high speed. A plurality of magnetic media in the form of disks 14 are stacked on the spindle motor 12. Let the uppermost disk and the lowermost disk be referred to as a top disk 14a and a bottom disk 14b, respectively. The adjoining disks 14 are spaced a predetermined distance from each other by a spacer ring 16 on the spindle motor 12. A top spacer 18 is mounted on the top of the stack of alternating disks 14 and spacer rings 16 in order to reduce the deformation of tile disks 14 in the circumferential direction. A clamp ring 20 is made of an elastic material and fastened to the upper end of the spindle motor 12 via the to space, 18 by a plurality of screws 22. When the clamp ring 20 is fastened to the spindle motor 12, it clamps the disks 14, spacer rings 16 and top spacer 18 to the spindle motor 12 due to the elastic deformation thereof. The spindle motor 12 and clamp ring 20 press the disks 14 and spacer rings 16 over the same diameter d as each other. This diameter d will be referred to as a pressing diameter hereinafter. Should the spindle motor 12 and clamp ring 20 press the disks 14 and spacer rings 16 at different positions from each other, the disks 14 and spacer rings 16 would deform, or warp, in the radial direction of the disks 14, as shown in FIG. 2.

The top spacer 18 and clamp ring 20 of the conventional disk drive 10 suffer from a lack of rigidity since they are made of aluminum and since the thickness thereof is limited in order to reduce the overall thickness of the disk drive 10. Specifically, when the clamp ring 20 is fastened to the spindle motor 12, the clamp ring 20 itself deforms to, in turn, cause the top spacer 18 to deform. As a result, the disks 14 themselves deform, following the deformation of the top spacer 18. Magnetic heads (not shown) cannot follow such deformation or the disks 14 and, therefore, fail to write or read data in or out of the disks 14 accurately. Moreover, the heads are apt to crash against the deformed disks 14.

Figure 3:
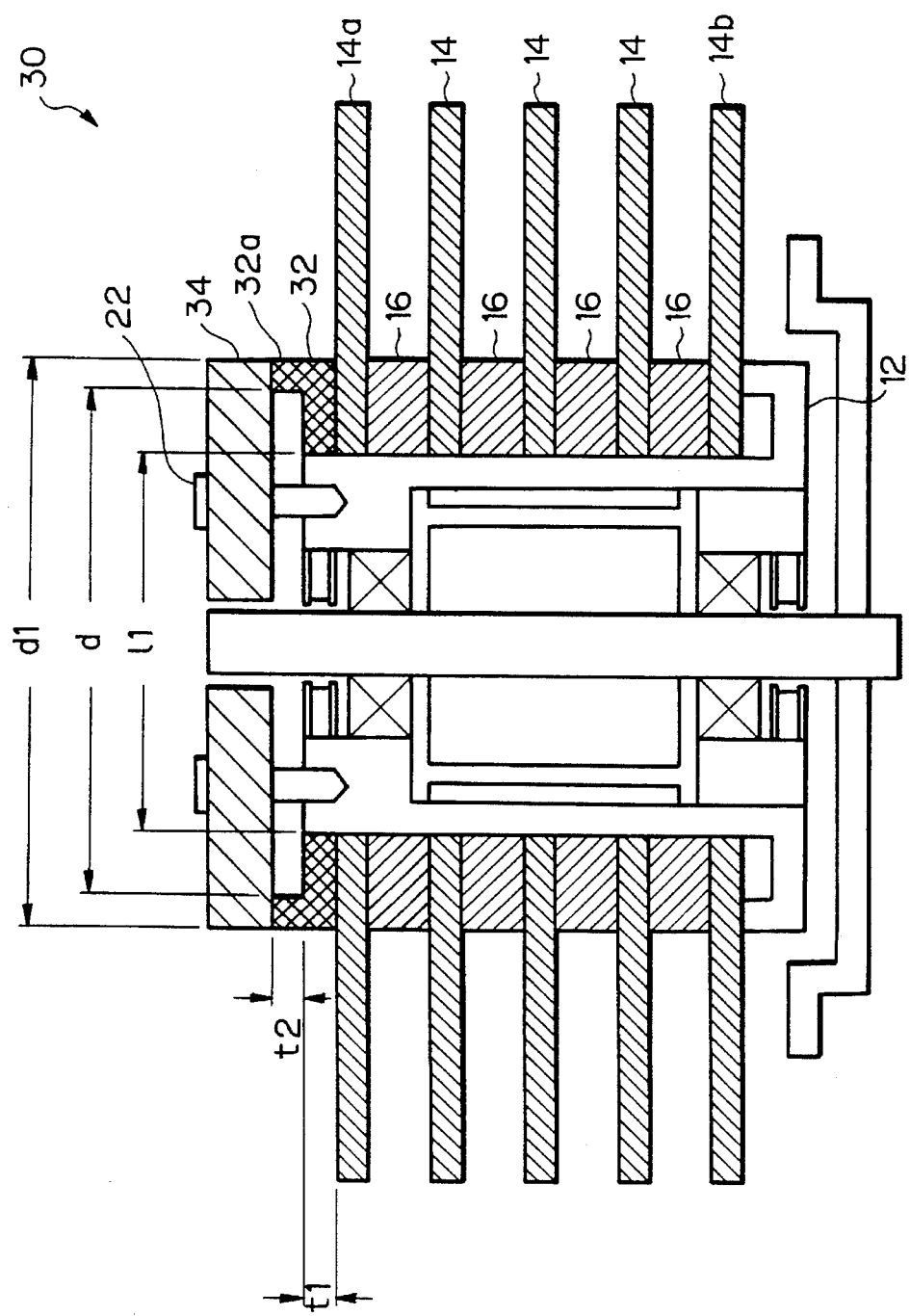
FIG. 3 is a section showing a magnetic disk drive embodying the present invention.

Referring to FIG. 3, a magnetic disk drive embodying the present invention is shown and generally designated by the reference numeral 30. In the figure, the same or similar constituent parts as the parts of the conventional disk drive 10 are designated by the same reference numerals. As shown, the disk drive 30 has a spindle motor 12 rotatable at high speed. A plurality of magnetic disks 14 are stacked on the spindle motor 12. The adjoining disks 14 are spaced a predetermined distance from each other by a spacer ring 16 on the spindle motor 12. A top spacer 32 is mounted on the top of the stack of alternating disks 14 and spacer rings 16 and made of ceramic having a high Young's modulus. The top spacer 32 is provided with an annular projection 32a which has the same pressing diameter d as the spindle motor 12. A cylindrical clamp ring 34 is affixed to the tipper end of the spindle motor 12 via the top spacer 32 by a plurality of screws 22. The clamp ring 34 has a substantial thickness and is not configured to have the pressing diameter d. When the clamp ring 34, made of an elastic material, is fastened to the spindle motor 12, it clamps the disks 14, spacer rings 16 and top spacer 32 to the spindle motor 12 due to the elastic deformation thereof.

As shown in FIG. 4, the ceramic, constituting the top spacer 32, has a higher Young's modulus than aluminum and stainless steel. This successfully obviates an occurrence that the axial forces of the screws 22, fastening the clamp ring 34 to the spindle motor 12, act as concentrated loads and cause the clamp ring 34 and, therefore, the disks 14 to deform. In the illustrative embodiment, the top spacer 32 has far greater rigidity than the conventional top spacer 18 and deforms little despite the deformation of the clamp ring 34. In this condition, the deformation of the clamp ring 34 is not transferred to the disks 14, so that the distortions (warping and waving) of the disks 14 are reduced.

Further, since the annular projection 32a of the top spacer 32 has the same pressing diameter d as the spindle motor 12, it is not necessary to provide the clamp ring 34 with a configuration having the diameter d. Hence, the clamp ring 34 can be provided with a greater thickness than the conventional clamp ring 20 having the pressing diameter d. Such a clamp ring 34 achieves far greater rigidity than the clamp ring 20. Consequently, the deformation of the clamp ring 34, which would cause the disks 14 to deform, is reduced. In addition, since the clamp ring 34 has a simple rectangular section not having the pressing diameter d, it is lower in cost and higher in precision than the conventional clamp ring 20.

The distortions, i.e., waving and warping of the disks 14 will be described hereinafter specifically. To begin with, experiments were conducted to compare the conventional aluminum top spacer 18 and the ceramic top spacer 32 of the embodiment with respect to the waving of the top disk 14a. As shown in FIG. 1, the conventional top spacer 18 had an outside diameter $d_1$ of 32 mm, an inside diameter $l_1$ of 25 mm, and a thickness $t_1$ of 10 mm. As shown in FIG. 3, the top spacer 32 of the embodiment had an outside diameter $d_1$ of 32 mm, an inside diameter $l_1$ of 25 mm and a thickness $t_1$ of 10 mm, while the projection 32a thereof had an inside diameter (pressing diameter) d of 28.5 mm and a thickness $t_2$ of 4 mm. The spacers 18 and 32 were each fastened to the spindle motor by the screws 22 by a torque of 4 kgf.cm. When such a fastening operation was repeated three times, the top disk 14a was found to wave as shown in FIG. 5. As the figure indicates, the aluminum top spacer 18 sequentially increased the waving of the top disk 14a every time it was fastened. In contrast, the ceramic top spacer 32 maintained the waving of the top disk 14a substantially constant throughout the consecutive fastening operations. The experiments showed that by using at least the top spacer 32 of the illustrative embodiment, it is possible to reduce the average waving of the top disk 14a from conventional 14.4 μm to 4.8 μm. As also shown in FIG. 5, a top spacer 18A was made of ceramic and provided with the conventional configuration shown in FIG. 1. Even with such a top spacer 18A, it was possible to reduce the average waving from conventional 14.4 μm to 5.6 μm.

Figure 6:
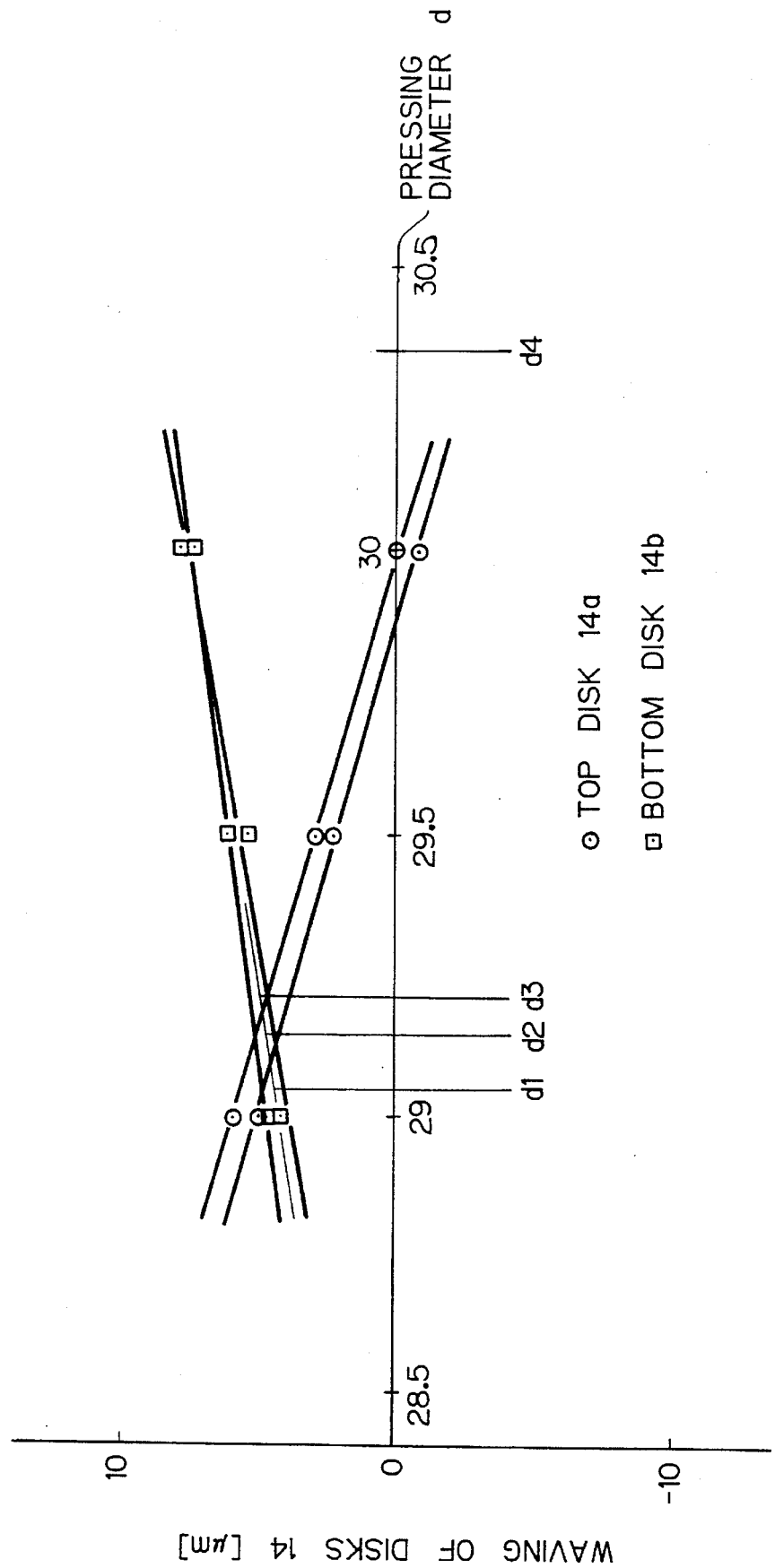
FIG. 6 is a graph showing an experimental relation between a pressing diameter and the waving of disks with respect to different fastening torques.

The warping of the disks 14, particularly an optimal pressing diameter, was experimentally determined with the top spacer 32 of the illustrative embodiment, as follows. For experiments, the fastening torque due to the screws 22 and the pressing diameter d were used as parameters. FIG. 6 shows a relation between the pressing diameter d and the warping of the disks 14, as determined with fastening torques of 0.5 kgf.cm, 0.8 kgf.cm, and 1.1 kgf.cm. It is to be noted that the torques of 0.5 kgf.cm, 0.8 kgf.cm and 1.1 kgf.cm respectively implement 1.3 times, 2.0 times and 3.0 times higher safety ratios of axial force against impact. The pressing diameter d was selected to be 29 mm, 29.5 mm, and 30 mm. As shown, when the fastening torque was 0.5 kgf.cm, the optimal pressing diameter was $d_1$; when the former was 0.8 kgf.cm, the latter was $d_2$; and when the former was 1.1 kgf.cm, the latter was $d_3$. Generally, however, at least two times higher safety ratio suffices. It follows that the optimal pressing diameter $d_2$ of 29.1 mm, associated with the fastening torque of 0.8 kgf.cm, is most preferable. In FIG. 6, an optimal pressing diameter $d_4$ was determined by simulation.

In summary, in accordance with the present invention, a magnetic disk drive has a top spacer made of ceramic having a high Young's modulus and provided with an annular projection on the top thereof. The projection has the same pressing diameter as a spindle motor. This kind of configuration avoids the need to machine a clamp ring in order to provide it with a pressing diameter. Hence, the clamp ring can have the thickness thereof increased in an amount corresponding to the structure having a pressing diameter. The clamp ring is, therefore, sufficiently rigid and deforms little. The combination of the top spacer and clamp ring having the above configurations successfully reduces the deformation of magnetic disks when they are fastened to the spindle motor by screws.

Various modifications will become possible for those skilled in the art after receiving in view of disclosure without departing from the scope thereof.

What is claimed is:

1. A magnetic disk drive capable of reducing distortions of magnetic disks, comprising:

a spindle motor rotatable at high speed while supporting a stack of magnetic disks and spacer rings alternating with each other;

a ceramic top spacer mounted on top of the stack, said top spacer having an annular projection on a top surface of said top spacer, said annular projection extending away from the spindle motor and having a pressing diameter which is equal to a pressing diameter of said spindle motor; and a clamp mounted over said top spacer and abuts said annular projection and said spindle motor for clamping the disks, the spacer rings and said top spacer to said spindle motor, so as to reduce radial distortion of said disks.

2. A magnetic disk drive as claimed in claim 1, wherein said clamp has a rectangular cross section in an axial direction of said spindle motor.

* * * * *